United States Patent [19]

Goetz

[11] Patent Number: 5,280,767
[45] Date of Patent: Jan. 25, 1994

[54] DETACHABLE WHEELS FOR PET CARRIER
[75] Inventor: Charles R. Goetz, Pittsburgh, Pa.
[73] Assignee: Alco Industries Inc., Valley Forge, Pa.
[21] Appl. No.: 51,557
[22] Filed: Apr. 23, 1993

Related U.S. Application Data

[63] Continuation-in-part of Ser. No. 866,889, Mar. 30, 1992.

[51] Int. Cl.[5] .............................................. A01K 1/03
[52] U.S. Cl. ...................................................... 119/19
[58] Field of Search ............... 119/19; 190/18 A, 18 R

[56] References Cited

U.S. PATENT DOCUMENTS

| | | | |
|---|---|---|---|
| 3,771,686 | 11/1973 | Brison | 119/19 X |
| 3,879,798 | 4/1975 | Krulwich | 190/18 A X |
| 3,889,966 | 6/1975 | Keitlin | 190/18 A X |
| 3,930,467 | 1/1976 | Fier, Jr. | 119/19 |
| 3,987,875 | 10/1976 | Szabo | 190/18 A |
| 4,422,212 | 12/1983 | Sheiman et al. | 190/18 A |
| 4,640,228 | 2/1987 | Sedlacek et al. | 119/17 X |
| 4,817,237 | 4/1989 | Murphy | 190/18 A X |

Primary Examiner—Gene Mancene
Assistant Examiner—Thomas Price
Attorney, Agent, or Firm—William J. Ruano

[57] ABSTRACT

Stackable rectangular containers, such as those for receiving pets, the top and bottom half of each container having spaced ledges adjacent the corners of the container for receiving extensions of the bases of rollers, when needed. When the rollers are removed, the containers become securely stacked by having upstanding rectangular portions which interfit with those of a stacked container at the four corners.

1 Claim, 3 Drawing Sheets

DETACHABLE WHEELS FOR PET CARRIER

This application is a continuation-in-part of my patent application Ser. No. 07/866,889 filed Mar. 30, 1992.

BACKGROUND OF THE INVENTION

Stackable pet carriers have stacking problems because of the wheels of such carriers.

SUMMARY OF THE INVENTION

An object of this invention is to overcome the stacking problems of stackable pet carriers separately mounted on wheels. This is achieved by making the wheels readily detachable by yieldable spring means depending from the wheel mounts which can be securely locked in place by interfitting parts.

DESCRIPTION OF THE PREFERRED EMBODIMENT

Figure 1:
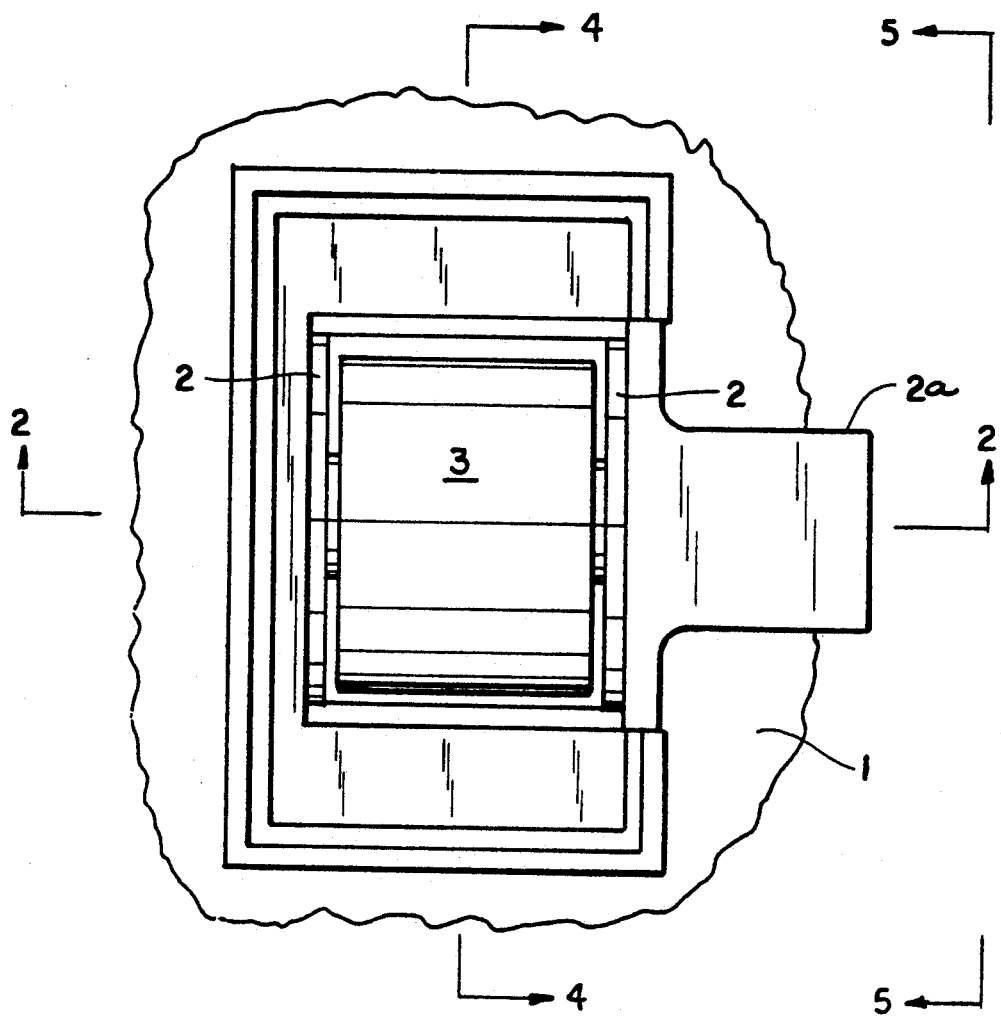
FIG. 1 is a plan view of the detachable wheel mount of the invention as viewed from the bottom of the pet carrier.
Figure 3:
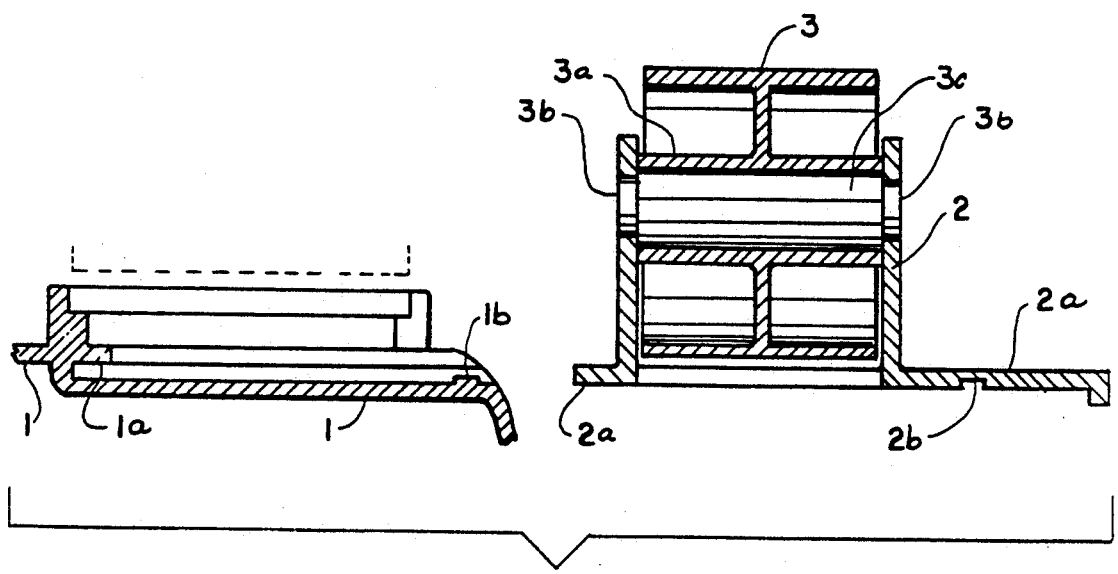
FIG. 3 is an exploded cross-sectional view of the structure shown in FIG. 2.

Referring to FIG. 1, numeral 1 denotes a fragmentary portion of the bottom surface of the carrier for pets or any other items and numeral 2 denotes the base having a flexible bottom portion 2a of the wheel mounting which has a bottom projection 2b which interfits a top groove 1b of the carrier base, which construction is also seen in FIG. 3, which latter Figure shows an extension 2a which slip-fits under extension 1a, at the same time, groove 2b interfits projection 1b.

Figure 2:
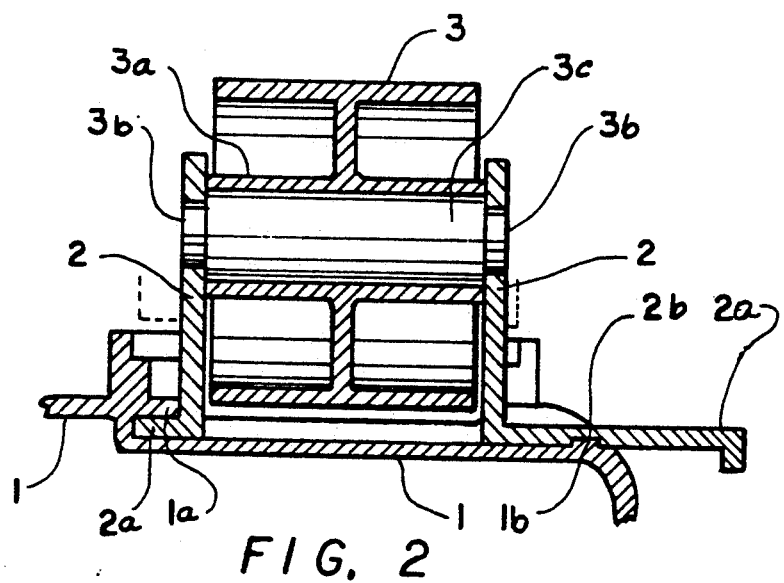
FIG. 2 is a cross-sectional view taken along line 2—2 of FIG. 1 adjacent one of the four corners of the bottom of the pet carrier.

Therefore, upon lifting of the extension 2a while in assembled position, shown in FIG. 2, the extension 1b of about 5/8" in length is withdrawn from the corresponding sized groove 2b so as to remove the wheel mounting from the carrier base.

Figure 4:
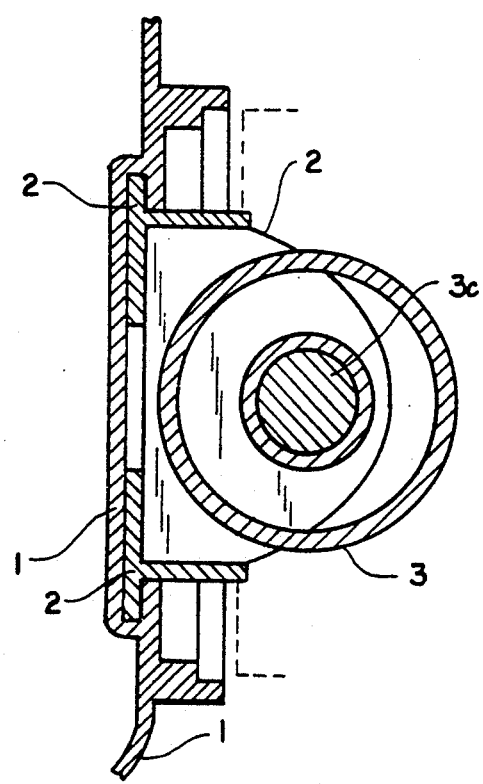
FIG. 4 is a vertical cross-sectional view taken along line 4—4 of FIG. 1.
Figure 5:
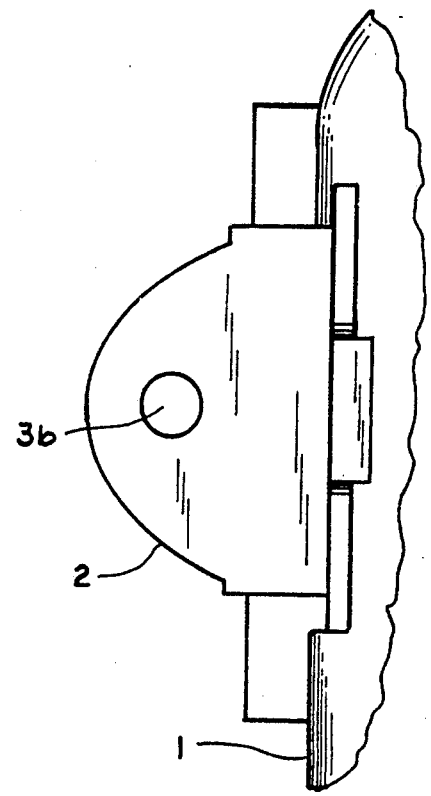
FIG. 5 is a side view of the structure shown in FIG 4.
Figure 6:
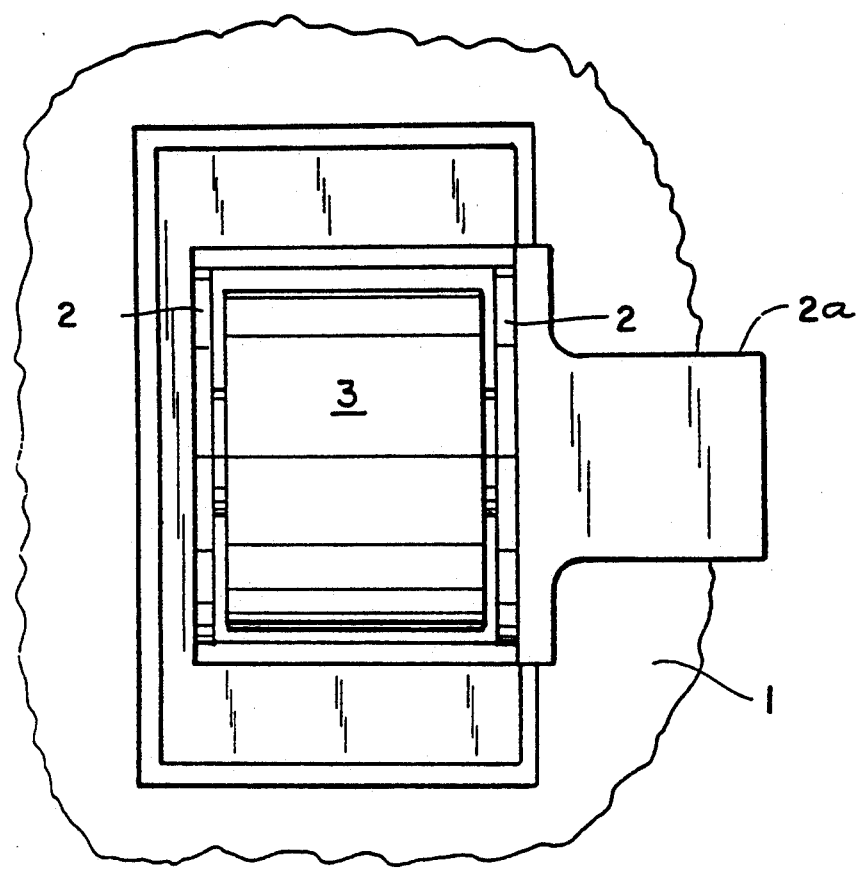
FIG. 6 is a top view of the roller.
Figure 7:
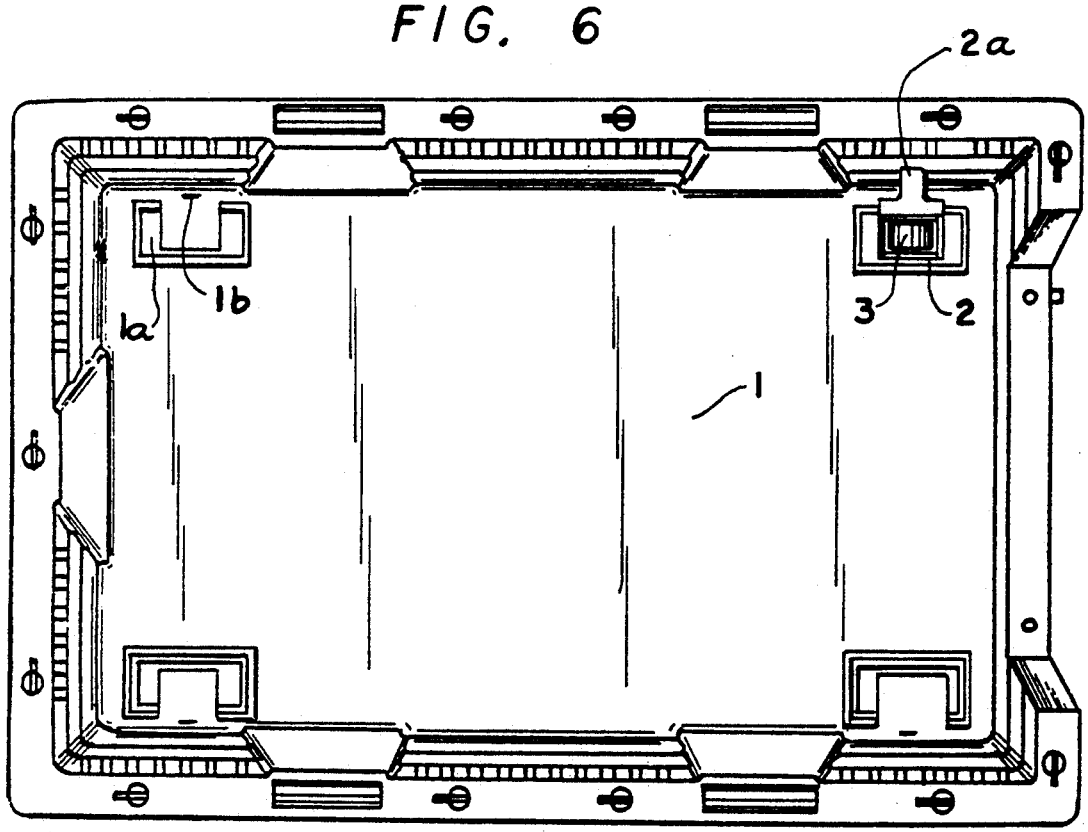
FIG. 7 is a bottom view of the rectangular container showing the four perimetrical portions and showing only one of the four rollers mounted.

Numerals 2, 2 as shown in FIG. 2 denote the sidewalls, and numerals 2a, 2a define the bottom extensions of said sidewalls. Numeral 3 denotes the wheel and 3c defines the axle and bearing surface for the wheel. Numeral 3b, 3b depict the ends of the axle which are fit into the sidewalls, numerals 2. The construction of the sidewalls is also shown in FIGS. 4 and 5.

I claim:

1. In combination with a corner portion of a carrier for pets or other items, said corner portion having a bottom surface, comprising a short, integral, horizontal extension of said bottom surface, a lower, integral, parallel spaced, bottom surface portion extension, a top projection adjacent the end of said bottom surface portion extension, a wheel mount having sidewalls with outwardly extending bases, one of said bases fitting under said short, integral horizontal extension of said bottom surface, the other of said bases being flexible and having a bottom groove which fits said top projection upon lifting said other of said bases, thereby forming a quick and secure fit of said wheel mount with said bottom surface portion extension.

* * * * *